United States Patent
Coers et al.

(10) Patent No.: US 6,592,453 B2
(45) Date of Patent: Jul. 15, 2003

(54) HARVESTER FEEDRATE CONTROL WITH TILT COMPENSATION

(75) Inventors: Bruce Alan Coers, Hillsdale, IL (US); Daniel James Burke, Cordova, IL (US); William F. Cooper, Fargo, ND (US); Jerry Dean Littke, Hillsboro, ND (US); Karl-Heinz O. Mertins, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/967,654

(22) Filed: Sep. 27, 2001

(65) Prior Publication Data

US 2003/0060245 A1 Mar. 27, 2003

(51) Int. Cl.$^7$ ................................................ A01F 12/00
(52) U.S. Cl. .............................. 460/4; 460/1; 56/10.26; 56/10.2 C; 701/50
(58) Field of Search ............................ 56/10.2 R, 10.3, 56/10.2 C, 10.26, 10.5, 10.8, 10.6, 11.1, 11.9, 12.1, 14.7, 14.9, 15.9, 208, 210, 214, DIG. 15; 460/1, 4, 6; 701/50, 53

(56) References Cited

U.S. PATENT DOCUMENTS

| | | | | |
|---|---|---|---|---|
| 3,731,470 A | * | 5/1973 | Cornish et al. ................ 56/208 |
| 4,130,980 A | * | 12/1978 | Fardal et al. ............. 56/10.2 F |
| 4,466,230 A | | 8/1984 | Osselaere et al. ............. 56/10.2 |
| 4,487,002 A | * | 12/1984 | Kruse et al. ..................... 460/6 |
| 4,513,562 A | | 4/1985 | Strubbe ................... 56/10.2 G |
| 4,727,710 A | * | 3/1988 | Kuhn ................... 56/DIG. 15 |
| 4,765,190 A | | 8/1988 | Strubbe ................... 73/861.72 |
| 4,893,241 A | * | 1/1990 | Girodat et al. ........... 56/10.2 G |
| 4,934,985 A | * | 6/1990 | Strubbe ........................ 460/4 |
| 5,711,139 A | | 1/1998 | Swanson ................. 56/10.2 R |
| 6,036,597 A | * | 3/2000 | Arner ............................. 460/6 |
| 6,052,644 A | * | 4/2000 | Murakami et al. .......... 123/319 |
| 6,119,442 A | * | 9/2000 | Hale ....................... 56/10.2 H |
| 6,431,981 B1 | * | 8/2002 | Shinners et al. ............... 460/6 |

FOREIGN PATENT DOCUMENTS

| | | |
|---|---|---|
| EP | 0 631 906 | 1/1995 |
| GB | 2 107 489 | 4/1983 |
| JP | 2000-300046 A * | 10/2000 |

OTHER PUBLICATIONS

Deere & Company, patent application S.N. 09/812,651 filed Mar. 20, 2001, entitled "Throughput Control for Combines".
Deere & Company, patent application S.N. 09/918,266 filed Jul. 30, 2001, entitled "Harvester Speed Control with Header Position Input".

* cited by examiner

Primary Examiner—Robert E. Pezzuto
Assistant Examiner—Nathan Mammen

(57) ABSTRACT

A combine with a throughput dependent speed control includes an angle sensor responsive to uphill, downhill and sidehill slopes. When the combine is angled from a level position, harvest speed is lowered to prevent grain losses from increasing above a target level. The control continuously learns tilt angle, loss and throughput correlation, and the speed reduction is selected based upon the learned correlation. In the preferred embodiment, throughput is estimated utilizing rotor variable drive actuator pressure (RVDAP), and a target RVDAP is modified for short periods of time in accordance with the learned correlation.

22 Claims, 3 Drawing Sheets

HARVESTER FEEDRATE CONTROL WITH TILT COMPENSATION

BACKGROUND OF THE INVENTION

The present invention relates generally to agricultural harvesters and, more specifically, to a feedrate control responsive to harvester tilt.

Throughput of a combine or similar crop harvesting device is typically maintained in a range that maximizes productivity while keeping one or more harvesting quality variables, such as grain loss or damage, at levels that are acceptable to the operator. Increasing harvester speed increases throughput, and as throughput increases, grain loss usually increases also. Various devices are available to sense the amount of material entering the feeder house or threshing and separating assembly of a combine and change the speed of the combine in response to changes in material to maintain a generally constant throughput. On a combine, throughput can be estimated by measuring actuator pressure of the variable drive that powers the rotor. Rotor variable drive actuator pressure (RVDAP) is a function of the feedrate, and feedrate tends to remain generally constant with constant RVDAP. By adjusting forward harvest speed to maintain a target RVDAP, productivity of the combine can be optimized. Such a device is described in copending and commonly assigned U.S. patent application Ser. No. 09/812,651 titled THROUGHPUT CONTROL FOR COMBINES filed on Mar 20, 2001. The target RVDAP can be modified if a harvesting quality variable differs from a desired quality target range over an extended period of time. For example, if target grain loss is exceeded for a period of time while operating at a target RVDAP, the target RVDAP will be reduced to decrease grain loss. In another copending and commonly assigned application, Ser. No. 09/918,266 entitled HARVESTER SPEED CONTROL WITH HEADER POSITION INPUT and filed Jul. 30, 2001, a conventional speed control controls harvester speed as a function of outputs of one or more sensors including a throughput sensor located downstream of the header. However, when the header is lowered., combine speed is immediately lowered to prevent a sudden increase in material downstream of the feeder housing input.

Although such systems as described above provide improved automatic control to increase harvester productivity and reduce operator fatigue, problems still exist with increased grain loss when the harvester is tilted from an upright position while operating on slopes. For example, a combine is designed to operate at highest efficiency when harvesting crop while level. As the combine tilts from the upright position on slopes, efficiency decreases and grain losses can increase significantly. Although grain loss on slopes can be reduced by slowing the combine, often the operator cannot properly estimate slope angles and anticipate sidehill losses. As a result, it is not uncommon for the operator to slow the machine much more than is necessary to maintain grain loss at target levels so that machine productivity is reduced and grain damage is increased. If the operator does not sufficiently reduce speed for the degree of slope, grain losses will exceed the target levels.

BRIEF SUMMARY OF THE INVENTION

It is therefore an object of the present invention to provide an improved feedrate control system for a combine or other harvester. It is a further object to provide such a system which overcomes most or all of the aforementioned problems.

It is another object of the invention to provide such a harvester feedrate control system which reduces the problems associated with harvesting on sloping ground surfaces. It is another object to provide such a system that improves harvester productivity and reduces grain loss or damage when the harvester is operating in a non-level condition.

It is yet another object of the invention to provide an improved harvester throughput control system wherein harvester throughput is automatically adjusted according to machine slope. It is a further object to provide such a system which automatically maintains maximum feedrate at the desired loss level for improved productivity and reduced grain loss and damage. It is another object to provide such a control which is sensitive to both side hill and up and down hill slopes and which learns the relationship between loss and throughput as a function of machine tilt.

The system for improved harvester throughput control on slopes includes a combine tilt sensor sensing uphill, downhill and sidehill slopes. The output of the tilt sensor is connected to a processor which correlates losses indicated by grain loss sensors on the combine with tilt angle and throughput. An automatic feedrate controller compensates for machine tilt angle by adjusting the feedrate to maintain the desired loss level. In one embodiment, the tilt sensor is integrated directly into the feedrate controller to avoid the expense of an external sensor, a separate enclosure and a wiring harness.

Combine speed adjustments are normally controlled by a speed control as a function of outputs of one or more sensors including a throughput sensor located downstream of the header and harvest quality sensors such as grain loss transducers. However, if the tilt sensor indicates that the combine is angled from a level position, the speed is automatically lowered to prevent grain losses from increasing above the target level. The control continuously learns tilt angle, loss and throughput correlation to accommodate changes in settings and operating conditions. The speed reduction is selected based upon the learned correlation. As the slope decreases and the combine approaches a level condition, normal speed control is resumed. In the preferred embodiment, throughput is estimated utilizing RVDAP, and a target RVDAP is modified for short periods of time according to the learned correlation with tilt.

The system relieves the operator of the difficult task of estimating slope angles and anticipating losses caused by machine tilt. The machine is slowed only as much as necessary to maintain grain loss at target levels so that machine productivity is increased and grain damage from underutilized capacity is reduced. Excessive grain loss resulting from insufficient machine slowing is also avoided. Necessary speed compensation is automatically provided for uphill and downhill slopes and side to side slopes. The continuous learning process optimizes speed changes to keep the quality variable within desired limits and maintain harvester productivity, even when combine settings and harvest conditions change.

These and other objects, features ,and advantages of the present invention will become apparent to one skilled in the art upon reading the following detailed description in view of the drawings.

DETAILED DESCRIPTION OF THE DRAWINGS

Figure 1:
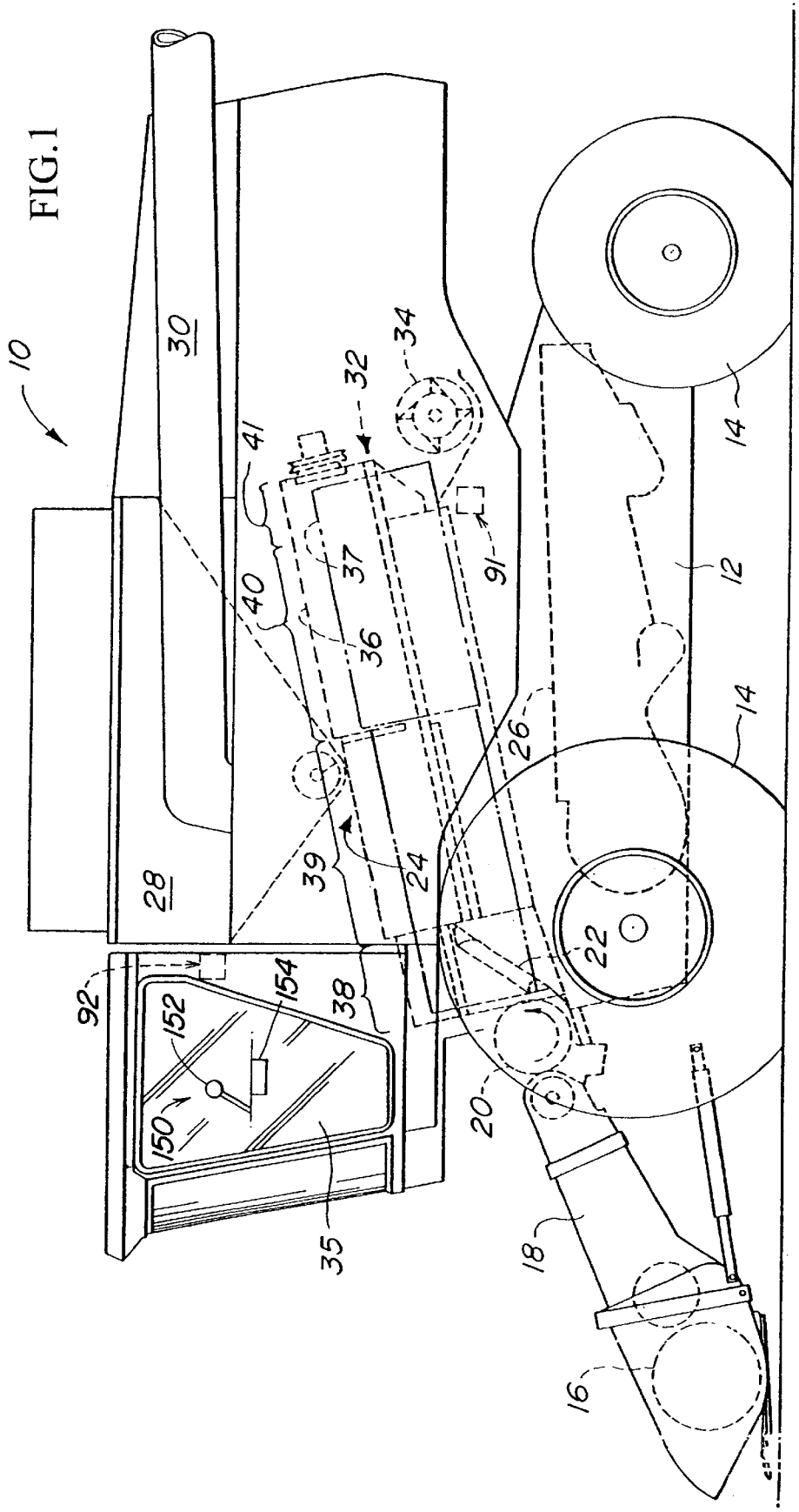
FIG. 1 is a side view of a harvester.

Referring now to FIG. 1 therein is shown an agricultural harvester or combine 10 comprising a supporting structure or frame 12 having ground engaging wheels 14 extending from the supporting structure. Although the combine 10 is illustrated as having wheels it could also have ground engaging tracks either full tracks or half tracks. A harvesting platform 16 is used for harvesting a crop and directing it to a feederhouse 18 which includes a conveyor for moving the harvested crop to a beater 20. The beater 20 directs the crop upwardly through an inlet transition section 22 to a rotary threshing and separating assembly 24. Although the illustrated threshing and separating assembly 24 is axially arranged in the combine 10, other orientations relative to the longitudinal axis of the combine may also be used. The present invention can be used on a combine having a conventional transverse threshing cylinder and concave assembly rather than a rotary threshing and separating assembly as shown.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38. Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24.

Figure 2:
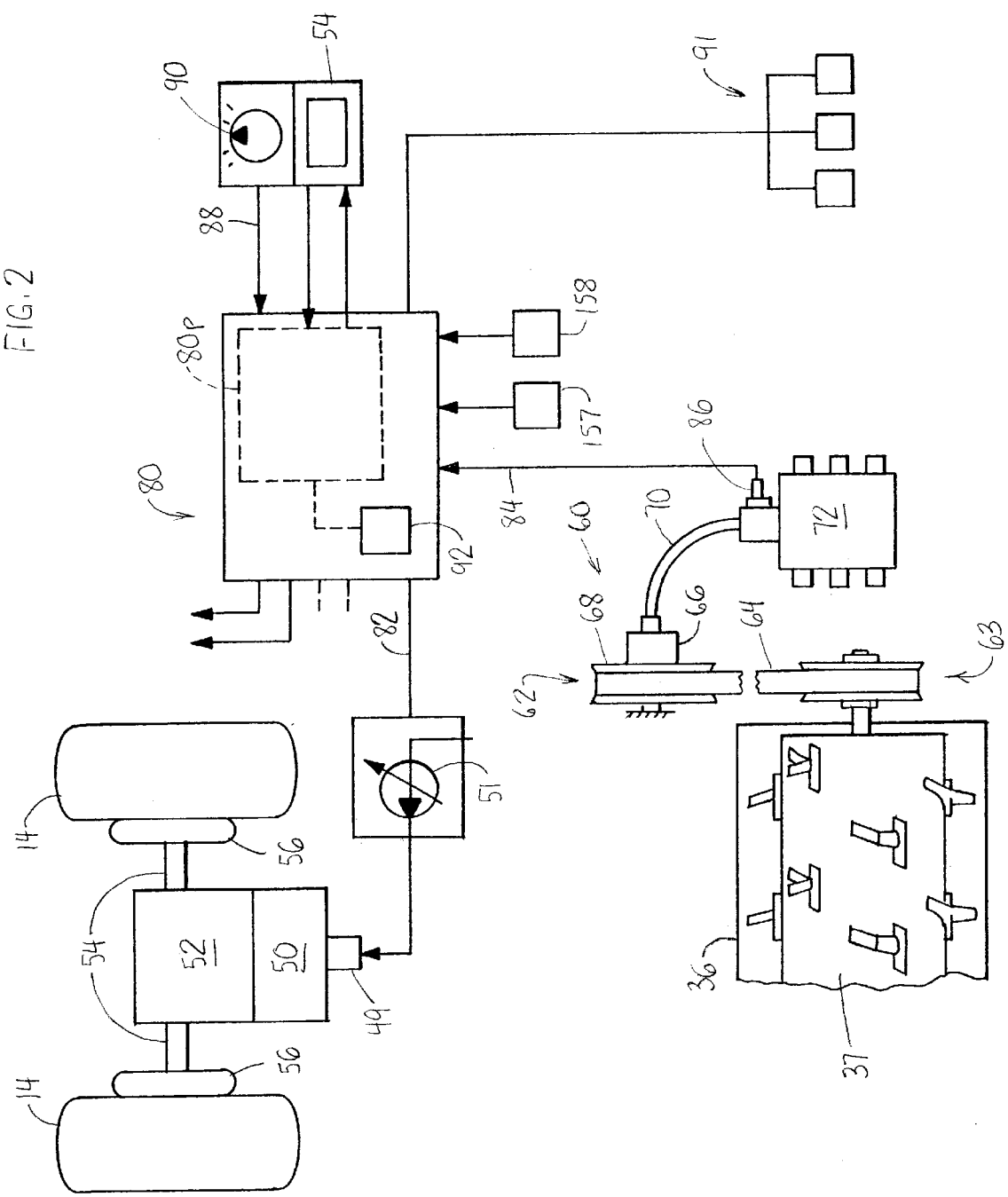
FIG. 2 is a schematic of a control system with tilt compensation for the harvester of FIG. 1.

The front wheels 14 of the combine 10 are driven by a hydrostatic motor 49 connected to a hydrostatic transmission 50 (FIG. 2). The motor 49 is powered in a conventional manner by an engine-driven hydrostatic pump 51. The pump 51 is provided with adjustable swash plates which control the output speed and direction of rotation of the transmission. Solenoid control valves adjust the positions of the swash plates. The hydrostatic transmission 50 drives a gear box 52, and two live axles 54 extend outwardly from the gear box 52 to driving connections with the final drives 56 of the front wheels 14. The steerable rear wheels 14 can also be driven by wheel motors directly mounted to the wheels. Wheel speed can be controlled by the throughput control system discussed below.

A variable torque sensing drive 60 drives the rotor 37. The same internal combustion engine that drives the hydrostatic transmission 50 drives the variable torque sensing belt drive 60. The drive 60 includes variable diameter drive sheave 62 and a variable diameter driven sheave 63. A belt 64 extends between the drive sheave 62 and the driven sheave for transmitting rotational power to the rotor 37. A hydraulic cylinder 66 controls the diameter of the drive sheave 62, and the driven sheave 63 is spring loaded to maintain belt tension. The hydraulic cylinder 66 is coupled to the drive sheave 62 and moves face plates 68 of the sheave 62 in and out to control the effective diameter of the sheave relative to the belt 64. By changing the effective diameter of the sheave 62 the effective speed of the driven sheave is changed. Pressurized hydraulic fluid is directed through hydraulic line 70 to the hydraulic cylinder 66 from a valve stack 72. The rotor 37 is driven at a constant selected rotor speed by the variable diameter sheaves. The torque transmitted by the belt 64 and sheaves varies as crop material throughput varies.

An electronic controller 80 regulates the harvesting speed of the combine 10 by controlling the solenoid control valves on the hydrostatic pump 51 via line 82 to adjust the positions of the swash plates in the pump. The controller 80 receives an actual hydraulic pressure signal, or rotor variable drive actuator pressure (RVDAP), through line 84 from hydraulic pressure sensor 86. RVDAP is a function of the feedrate, and feedrate tends to remain generally constant with constant RVDAP. Therefore, by controlling the harvester speed to maintain a preselected RVDAP, throughput remains generally constant. Hydraulic pressure sensor 86 senses the hydraulic pressure in the variable torque sensing drive 60. Hydraulic pressure in the variable torque sensing drive 60 is related to throughput which, in turn, affects harvest quality variables such as grain loss, grain damage and dockage.

The controller 80 receives a desired harvest quality level signal input, such as an acceptable grain loss rate, via line 88 from an operator control 90 in the, cab 35 or other entry device. A harvest quality transducer 91, which is shown in FIG. 1 as a grain loss sensor located near the outlet 32, provides harvest quality signals to the controller 80. A harvester tilt sensor or transducer 92 is supported at a convenient location on the frame 12 (FIG. 1) and provides signals to the controller 80 indicative of the amount of harvester tilt away from a generally level or horizontal position which is shown in FIG. 1. Preferably, the transducer 92 provides side-to-side tilt angle and front-to-back tilt angle information to the controller 80. As shown in FIG. 2, the transducer is integrated directly into the circuit board of the controller 80 to avoid the expense of an external sensor, a separate enclosure and a wiring harness.

An operator's console 150 located in the cab 35 includes conventional operator controls including a hydro shift lever 152 for manually controlling the speed range and output speed of the hydrostatic transmission 50. An operator interface device 154 in the cab 35 facilitates entry of information into a processor system 80p to provide automatic speed control and numerous other control functions for the harvester 10. Readouts from various on-board sensors 157 and microcontrollers 158 are provided by the device 154. The operator can enter various types of information via input lines 88 and 154a, including crop type, location, yield, and acceptable grain loss, damage and dockage and the like.

For combine operation, a desired harvest quality variable such as loss rate is input to the controller 80 using the operator control 90. Based upon initial setup entries (or upon learned correlations as described in detail below) the controller 80 calculates an initial target RVDAP for the setting on the control 90. The controller 80 receives the actual pressure signal from the sensor 86 and an actual loss rate signal or other harvest quality signal from the transducer 91 and regulates the forward speed of the combine so that the RVDAP is established at the initial target level. The controller polls the transducer 91 and determines if the loss rate for the initial target RVDAP while the combine is operating in a level condition is at the desired level. If over an extended period of time the loss rate is greater than set by the control 90 for the initial target RVDAP, the target RVDAP is gradually reduced by reducing combine speed until the desired loss rate is reached, and a new RVDAP is established. If the loss rate over an extended period of time is less than the entered rate, target RVDAP is gradually increased by an increase in combine speed until the desired rate is achieved. The controller 80 continually updates the target RVDAP for level operation during harvesting to compensate for changing conditions.

If the combine tilts from the level condition and the controller 80 receives a tilt signal from the transducer 92, the controller 80 will slow the combine 10 to decrease throughput to thereby prevent an increase in the harvest quality variable. The processor 80p stores or calculates information correlating expected quality variable as a function of tilt angles and throughput. Therefore, for a given tilt angle, the target RVDAP can be modified to change combine speed so the quality variable will remain generally constant. In one embodiment of the invention, the processor 80p learns the correlation between tilt, harvest quality and throughput and continually updates the stored information so that throughput adjustments can be made quickly and accurately, even in changing crop and harvesting conditions.

Figure 3:
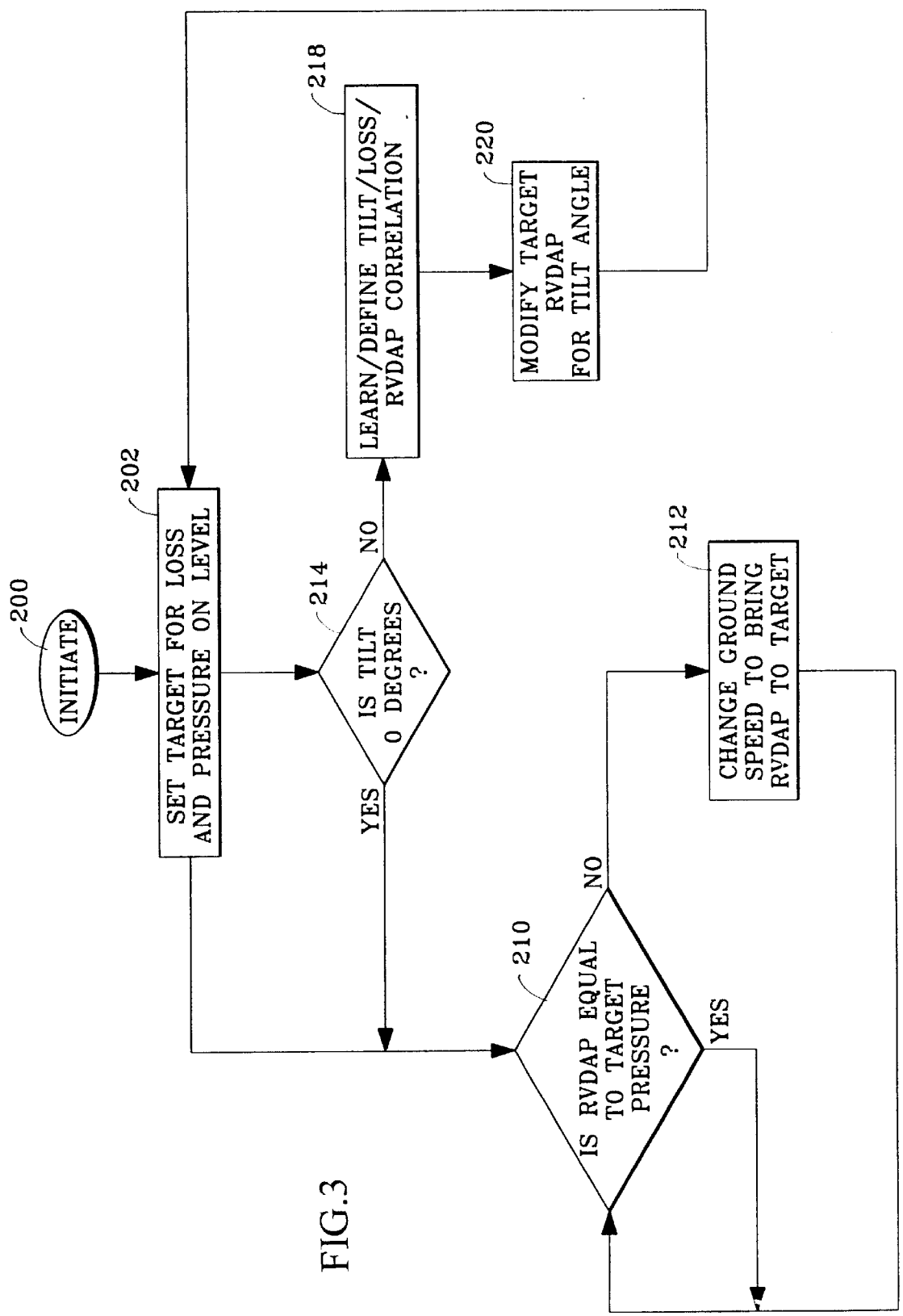
FIG. 3 is a flow diagram for the control system shown in FIG. 2.

By way of example, a flowchart for operation of the processor 80p is shown in FIG. 3. After the feedrate control is activated, targets are set at 202 for throughput and grain loss, and the throughput target is modified as described above to provide the desired grain loss. If the measured loss is consistently high or low over an extended period of time, the target RVDAP will be adjusted slowly to bring the grain loss to the desired level. Other harvest quality inputs may also be utilized to adjust the target RVDAP if desired. Initial targets may be entered by the operator utilizing the input device 154 based on knowledge and experience, or targets stored in memory or calculated for the particular field and crop type or for the immediately preceding harvest conditions can be selected.

Throughput is measured as a function of RVDAP (transducer 86) and remains fairly constant with constant RVDAP. During operation of the combine, RVDAP is continually monitored at 210. If RVDAP deviates from the desired range, combine speed is increased or decreased at 212, depending on whether RVDAP is below or above the target level set at 202. Also, the tilt transducer 92 is polled at 214 to determine if the combine is tilting away from a level condition. If combine tilt is detected at 214, the processor determines a relationship between loss, RVDAP and tilt at 218 to define a correlation equation or store in memory a map of the relationship between loss and RVDAP as a function of tilt. When machine tilt is detected and increased loss (or other deterioration of harvest quality) is detected, the processor 80p modifies the target RVDAP at 220. This process allows the controller 80 to adjust speed until the processor identifies the correct correlation between tilt, loss and RVDAP and can maintain a constant loss by momentarily modifying the target according to the learned correlation.

Having described the preferred embodiment, it will become apparent that various modifications can be made without departing from the scope of the invention as defined in the accompanying claims.

We claim:

1. In a harvester having a frame supported by wheel structure for forward movement through a field of standing crop having uphill, downhill and sidehill slopes, a crop processing structure supported by the frame and connected to a processor drive, wherein rate of material flow to the processing structure is dependent on harvester forward speed and wherein a harvest quality variable of the harvester is dependent on the forward speed of the harvester and the tilt of the harvester from a level position, a speed control comprising:

a throughput transducer providing a throughput signal indicative of the rate of material flow;

a tilt transducer providing a harvester tilt signal;

a controller providing a throughput target for harvester operation in the level position and responsive to the throughput signal for adjusting the forward speed of the harvester; and wherein the controller is also responsive to the tilt signal to modify the throughput target to automatically reduce harvester speed and generally maintain the harvest quality variable within a desired range as the harvester moves over the slopes.

2. The speed control as set forth in claim 1 wherein harvest quality variable is grain loss and the speed control includes a grain loss transducer providing a grain loss signal to the controller.

3. The speed control as set forth in claim 1 wherein the controller includes a processor establishing the throughput target for harvester operation in the level position and modifying the throughput target in dependence on the tilt signal when the harvester is operating on a slope.

4. In a harvester having a frame supported by wheel structure for forward movement through a field of standing crop having uphill, downhill and sidehill slopes, a crop processing structure supported by the frame and connected to a processor drive, wherein rate of material flow to the processing structure is dependent on harvester forward speed and wherein a harvest quality variable of the harvester is dependent on the forward speed of the harvester and the tilt of the harvester from a level position, a speed control comprising:

a throughput transducer providing a throughput signal indicative of the rate of material flow;

a tilt transducer providing a harvester tilt signal;

a controller providing a throughput target for harvester operation in the level position and responsive to the throughput signal for adjusting the forward speed of the harvester to generally maintain the harvest quality variable within a desired range; and wherein the controller includes a processor for learning tilt and harvest quality variation correlation, wherein the controller is responsive to the learned correlation to automatically adjust the harvester speed in dependence on the tilt signal, the amount of adjustment of speed being dependent on the learned correlation to generally maintain the quality variable with the desired range.

5. The speed control as set forth in claim 4 wherein the throughput transducer comprises a pressure transducer sensing a processor drive variable drive actuator pressure.

6. The speed control as set forth in claim 5 wherein the controller includes a processor responsive to a change in the harvest quality variable, the sensed actuator pressure and the tilt signal to learn the relationship between the harvest quality variable, the throughput signal and the tilt signal so the controller can adjust the forward speed to maintain a generally constant harvest quality variable.

7. The speed control as set forth in claim 6 wherein the processor sets a target throughput level and adjusts the target throughput level according to the learned relationship.

8. A method for controlling operation of a harvester for harvesting a crop in a field having slopes, the harvester having a harvest quality variable dependent on tilt of the harvester from a level condition, the harvester having an electronic speed control for automatically adjusting harvester speed, wherein the harvesting speed establishes a harvester throughput, and harvest quality is also dependent on the throughput, the method comprising:

establishing a desired speed for operating the harvester on level conditions, the desired speed depending on a target throughput;

maintaining the harvester speed generally at the desired speed to maintain the target throughput;

detecting harvester tilt; and modifying the target throughput to reduce the harvester speed automatically, when harvester tilt is detected, as a function of the detected harvester tilt to reduce variations in the harvest quality variable as the harvester tilts from the level condition on the slopes.

9. The method as set forth in claim 8 wherein the step of modifying the target throughput includes immediately lowering the target throughput when harvester tilt is detected to thereby immediately reduce harvester speed to prevent deterioration of the quality variable.

10. The method as set forth in claim 9 wherein the step of modifying the target throughput includes momentarily modifying the target throughput and determining the change in the harvest quality variable as a result of the modification of the target throughput.

11. The method as set forth in claim 10 including providing a processor that learns information related to tilt and harvest quality variables and utilizes the learned information to establish the correlation between the variables.

12. The method as set forth in claim 8 wherein the step of modifying the target comprises correlating harvester tilt with changes in the harvest quality variable.

13. The method as set forth in claim 8 wherein the step of establishing a desired speed includes setting a target monitored harvester condition output and a target throughput, and monitoring actual harvester condition output and modifying the set target throughput if monitored harvester condition output varies from the set target output.

14. The method as set forth in claim 13 wherein the monitored harvester condition is grain loss.

15. In a combine a harvest control system including a speed control maintaining a generally constant crop throughput while the combine is harvesting crop, including an angle sensor responsive to the operation of the combine on slopes and providing a tilt signal to the speed control, wherein a crop harvest quality variable is dependent on crop throughput and combine tilt, a crop quality sensor providing a crop harvest quality signal to the speed control, and wherein the speed control is responsive to the crop harvest quality signal to adjust combine speed and vary throughput, the speed control additionally responsive to the tilt signal to automatically reduce combine speed in dependence on the combine tilt to maintain a generally constant harvest quality variable when the combine is operating on slopes.

16. The control system as set forth in claim 15 wherein the variable is grain loss.

17. The control system as set forth in claim 15 wherein the speed control includes a processor which learns correlation between combine tilt, crop harvest quality and throughput and utilizes the learned correlation to adjust the amount of speed reduction as a function of the combine tilt maintain the harvest quality variable in a desired range.

18. The control system as set forth in claim 15 wherein the crop harvest quality signal comprises a grain loss signal.

19. The control system as set forth in claim 15 wherein the angle sensor is responsive to uphill, downhill and sidehill slopes.

20. The control system as set forth in claim 15 wherein speed control establishes a target throughput for level operation and temporarily modifies the target throughput in dependence on the tilt signal.

21. The control system as set forth in claim 20 including rotor variable drive actuator pressure transducer providing a throughput signal to the speed control.

22. The control system as set forth in claim 15 wherein the angle sensor comprises a tilt transducer mounted directly on a speed control circuit board.

* * * * *